United States Patent [19]
Kristen et al.

[11] 3,942,054
[45] Mar. 2, 1976

[54] STATOR WINDING FOR A MINIATURE BRUSHLESS DC MOTOR

[75] Inventors: Reiner Kristen; Manfred Liska, both of Nurnberg, Germany

[73] Assignee: Siemens Aktiengesellschaft, Munich, Germany

[22] Filed: Nov. 14, 1974

[21] Appl. No.: 523,850

[30] Foreign Application Priority Data
Nov. 30, 1973 Germany.................... 7342752[U]

[52] U.S. Cl................... 310/179; 310/43; 310/254
[51] Int. Cl.²......................................... H02K 1/18
[58] Field of Search ..... 310/40, 140 MM, 156, 179, 310/43

[56] References Cited
UNITED STATES PATENTS
3,082,337  3/1963  Horsley................................ 310/179
3,529,192  9/1970  Davies ................................ 310/179

*Primary Examiner*—Donovan F. Duggan
*Attorney, Agent, or Firm*—Kenyon & Kenyon Reilly Carr & Chapin

[57] ABSTRACT

In a stator winding for a miniature brushless dc motor comprising a plurality of component windings designed as frame windings injection molded in plastic and nested together in such a manner that they form a cylinder surrounding the permanent magnet rotor of the motor and which can be inserted into a ring-shaped magnetic yoke without slots, the cylinder is formed, on at least one end, with a tubular extension having radial projections which are adapted to engage corresponding recesses at the housing or end bell of the motor for transmitting the reaction moment acting on the cylinder.

6 Claims, 1 Drawing Figure

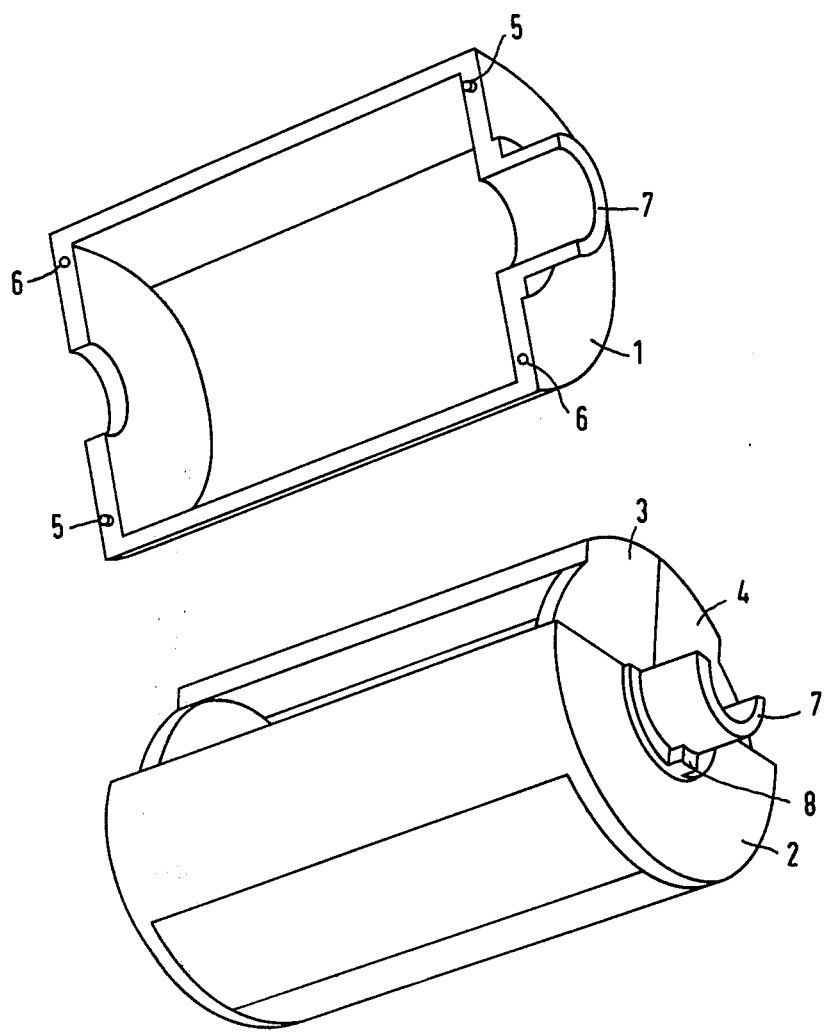

STATOR WINDING FOR A MINIATURE BRUSHLESS DC MOTOR

BACKGROUND OF THE INVENTION

This invention relates to stator windings for miniature brushless dc motors in general and more particularly to an improved stator winding of the type in which several component windings are designed as injection molded frame windings.

Stator windings for a miniature brushless dc motor comprising a plurality of component windings designed as frame windings injection molded in plastic and nested together to form a cylinder surrounding the permanent magnet rotor of the motor and which can be inserted into a ring-shaped magnetic return yoke without slots are disclosed in German Offenlegungsschrift No. 1,613,379. In the stator winding disclosed therein the reaction moment acting on the winding is transmitted through a frictional connection between the cylinder and the magnetic return yoke which is connected to the housing. In order to achieve the necessary positive transmission between the return yoke and the cylinder formed by the frame windings, the cylinder must rest firmly against the return yoke. This requires a high dimensional accuracy in the cylinder which is to be inserted into the return yoke. However, when using parts which are injection molded in plastic such dimensional accuracy can be achieved only with great difficulty. A further problem arises because the plastic materials typically used in such applications change their dimensions as a function of climatic influences. The plastics can shrink or swell depending on the ambient temperature and air humidity. Because of these properties it is difficult to insert the cylinder formed by the frame windings into the return yoke in such a manner that perfect transmission of the reaction moment acting on the winding is assured at all times.

Thus, the need for an improved design for stator windings of this nature which will ensure reliable transmission of the reaction momemnt acting on the windings to the motor housing without placing any special requirements as to dimensional accuracy of the frame windings becomes evident.

SUMMARY OF THE INVENTION

The present invention provides a solution to this problem by providing the cylinder formed by the frame windings with means on at least one end face which permit connection in a form fitting manner to a housing part or an end bell of the motor.

In the illustrated embodiment the frame windings lying on the outside of the end faces of the cylinder have a tubular extension which contains radial projections which engage corresponding recesses at the housing or end bell of the motor. In accordance with a further feature the nested frame windings are enabled to be held together well and to be centered by the inclusion of snapping connections at the mutual contact points. An unchangeable mutual positioning of the frame windings is achieved by placing the inner frame windings in the outer frame windings in a form fitted manner.

BRIEF DESCRIPTION OF THE DRAWINGS

The single FIGURE is an exploded perspective view of an embodiment of the present invention.

DETAILED DESCRIPTION OF THE PREFERRED EMBODIMENT

The stator winding of the present invention is made up of four frame windings, 1, 2, 3 and 4, each of which is injection molded in plastic. On the FIGURE, three of the frame windings, 2, 3 and 4 are shown nested together with the fourth frame winding 1 not yet in place. The inner frame windings 3 and 4 have a shorter axial length than the outer frame windings 1 and 2, so that the frame windings 1 and 2 can engage over the frame windings 3 and 4 at their end faces.

At the surfaces where mutual contact takes place between two frame windings of equal size, projections 5 and holes 6 are provided as illustrated on the frame winding 1. When the frame windings 1 and 2 or 3 and 4 are put together the projections 5 engage in the holes 6 thereby forming snap connections holding the respective frame windings firmly together and centering them with respect to each other.

The frame windings 1 and 2 which are of larger axial length than the frame windings 3 and 4 engage over the end faces of the frame windings 3 and 4. The frame windings 1 and 2 have a tubular extension 7 on at least one end. Half of the tubular extension is formed on each of the frame windings 1 and 2. Each half of the tubular extension 7 has a radial projection 8 which is molded into the extension. The projection 8 engages a corresponding recess in the end bell or the housing (hereinafter housing refers to either the end bell or the housing) of the motor which is not shown in the drawing. Through use of the radial projections 8, the reaction moment acting on the winding is transmitted to the housing of the motor. As a result the cylinder formed by the windings 1 through 4 no longer needs to be fitted firmly into the magnetic return yoke of the motor. Because of the form fitting connection between the cylinder formed by the frame windings 1 through 4 and the housing of the motor the cylinder cannot turn in the magnetic return yoke. This prevents the plastic, which protects the windings, from wearing down. Furthermore an exact physical relationship between the stator winding and position transducers in the motor which pick up the rotor position is preserved.

Designing the stator winding in the illustrated manner using several frame windings has a further advantage in that should there be a defective stator winding, i.e., a shorted turn, the entire stator winding need not be replaced, but only the frame winding having the defect need be exchanged.

Thus, an improved manner of constructing the stator winding for a miniature brushless dc motor has been shown. Although specific embodiments have been illustrated and described, it will be obvious to those skilled in the art that various modifications may be made without departing from the spirit of the invention which is intended to be limited solely by the appended claims.

What is claimed is:

1. In a stator winding for a miniature brushless dc motor, comprising a plurality of component windings designed as frame windings injection molded in plastic and nested together to form a cylinder for enclosing the permanent magnet rotor of the motor which cylinder is inserted into a ring-shaped magnetic return yoke without slots, wherein the improvement comprises means on at least one end face of the cylinder formed by the frame windings for connecting the cylinder in a form fitted manner with the housing of the motor, said means comprising a cylindrical tubular extension extending from at least one end face of the frame winding on the outside, said tubular extension having formed thereon radial projections for engaging corresponding recesses in said housing.

2. A stator winding according to claim 1, wherein said stator is made up of inner frame windings and outer frame windings and wherein the inner frame windings are contained within the outer frame windings with a tight fit.

3. A stator winding according to claim 1, wherein frame windings of the same length which are in contact with each other are provided with snap connections at mutual contact points.

4. A stator winding according to claim 1, wherein frame windings of the same length which are in contact with each other are provided with snap connections at mutual contact points.

5. A stator winding according to claim 1, wherein said stator is made up of inner frame windings and outer frame windings and wherein the inner frame windings are contained within the outer frame windings with a tight fit.

6. A stator winding according to claim 5, wherein frame windings of the same length which are in contact with each other are provided with snap connections at mutual contact points.

* * * * *